US008862839B2

(12) United States Patent
Asano et al.

(10) Patent No.: US 8,862,839 B2
(45) Date of Patent: *Oct. 14, 2014

(54) STORAGE SYSTEM AND STORAGE MANAGEMENT METHOD FOR CONTROLLING OFF-LINE MODE AND ON-LINE MODE OF FLASH MEMORY

(75) Inventors: Masayasu Asano, Yokohama (JP); Hiroshi Nasu, Yokohama (JP); Masayuki Yamamoto, Sagamihara (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,588

(22) Filed: May 8, 2012

(65) Prior Publication Data
US 2012/0297119 A1 Nov. 22, 2012

Related U.S. Application Data

(63) Continuation of application No. 13/194,841, filed on Jul. 29, 2011, now Pat. No. 8,200,893, and a continuation of application No. 12/019,049, filed on Jan. 24, 2008, now Pat. No. 8,019,930.

(30) Foreign Application Priority Data

Feb. 7, 2007 (JP) ................................. 2007-028262

(51) Int. Cl.
*G06F 12/00* (2006.01)
*G06F 12/02* (2006.01)
(52) U.S. Cl.
CPC .... *G06F 12/0246* (2013.01); *G06F 2212/7201* (2013.01)
USPC ........... 711/156; 711/103; 711/114; 707/824; 710/14; 712/203; 712/248

(58) Field of Classification Search
CPC .... G06F 3/064; G06F 3/0688; G06F 12/0238
USPC ..................... 711/103, 248; 707/824; 710/14; 712/203, 114, 156
See application file for complete search history.

(56) References Cited

U.S. PATENT DOCUMENTS 7,236,992 B2 6/2007 Yano et al.
7,246,247 B2 7/2007 Matsuzaki et al.
(Continued)

FOREIGN PATENT DOCUMENTS

JP 08174926 A 7/1996
JP 11212730 A 8/1999
(Continued)

OTHER PUBLICATIONS

Japanese Office Action corresponding to Japanese Patent Application No. 2007-028262, dated Sep. 13, 2011.

*Primary Examiner* — Reba I Elmore
(74) *Attorney, Agent, or Firm* — Sughrue Mion, PLLC

(57) ABSTRACT

A storage system which has flash memories constituting a storage area and a function of placing and handling the flash memories in on-line mode and off-line mode, and which stores and manages management information of the flash memories in on-line mode. The storage system includes: when some or all of flash memory in on-line mode is placed in off-line mode, creating a management area in off-line mode in the flash memories by moving existing data in an area used as the management area to an area other than the management area; writing the management information of the flash memories to the created management area; and placing the flash memories in off-line mode.

14 Claims, 9 Drawing Sheets

(56) References Cited

U.S. PATENT DOCUMENTS

| | | | |
|---|---|---|---|
| 7,861,122 B2 * | 12/2010 | Cornwell et al. | 714/42 |
| 8,019,930 B2 * | 9/2011 | Asano et al. | 711/103 |
| 8,200,893 B2 * | 6/2012 | Asano et al. | 711/103 |
| 2004/0030825 A1 * | 2/2004 | Otake et al. | 711/105 |
| 2005/0120057 A1 | 6/2005 | Hashimoto et al. | |
| 2006/0171570 A1 | 8/2006 | Brendley et al. | |
| 2008/0091876 A1 * | 4/2008 | Fujibayashi et al. | 711/113 |

FOREIGN PATENT DOCUMENTS

| | | |
|---|---|---|
| JP | 11272569 A | 10/1999 |
| JP | 2003248620 A | 9/2003 |
| JP | 2003256247 A | 9/2003 |
| JP | 2003337749 A | 11/2003 |
| JP | 2005141644 A | 6/2005 |

* cited by examiner

| FLASH MEMORY NUMBER (2000) | VOLUME NUMBER (2001) | START LOGICAL SECTOR (2002) | FINAL LOGICAL SECTOR (2003/2004) |
|---|---|---|---|
| 1 | 1 | 0 | 999 |
|   | 2 | 1000 | 1999 |
| 2 | 1 | 10000 | 10999 |
|   | 2 | 11000 | 11999 |
| 3 | 1 | 20000 | 20999 |
|   | 2 | 21000 | 21999 |
| 4 | 1 | 30000 | 30999 |
|   | 2 | 31000 | 31999 |
|   |   |   |   |
| N | 100 | 100000 | 102999 |

| PARITY GROUP NUMBER (2100) | STORAGE MEDIUM NUMBER (2101/2102) | RAID TYPE (2103) |
|---|---|---|
| 1 | 1、2、3、4 | RAID 5 |
| 2 | 5、6、7、8 | RAID1 |

2000 : VOLUME TABLE

2100 : PARITY GROUP TABLE

| FLASH MEMORY NUMBER (3000) | SECTOR NUMBER (3001) | WRITING LIFE (3002) | LOGICAL SECTOR (3003) | PHYSICAL SECTOR (3004) |
|---|---|---|---|---|
| 1 | 0 | 30% | 0 | 0 |
| | 1 | 40% | 1 | 1 |
| | | | | |
| | 5000 | 0% | 5000 | 5000 |
| | 5001 | 0% | 5001 | 5001 |
| | | | | |
| | N | 50% | 9999 | 9999 |
| | | | | |
| N | 0 | 20% | 100000 | 0 |
| | 1 | 30% | 100001 | 1 |
| | | | | |
| | n | 40% | 109999 | 9999 |

| FLASH MEMORY NUMBER (3100) | ON-LINE/OFF-LINE (3101) |
|---|---|
| 1 | ON-LINE |
| 2 | ON-LINE |
| | |
| 1 0 5 | OFF-LINE |
| | |
| N | ON-LINE |

3000: FLASH MEMORY SECTOR TABLE
3100: FLASH MEMORY STATE TABLE

FIG.4

| FLASH MEMORY NUMBER | MANAGEMENT AREA START PHYSICAL SECTOR | MANAGEMENT AREA FINAL PHYSICAL SECTOR |
|---|---|---|
| 1 | 0 | 1 0 0 |
| 2 | 0 | 1 0 0 |
| 3 | 0 | 1 0 0 |
| 4 | 0 | 1 0 0 |

4000 : FLASH MEMORY MANAGEMENT AREA TABLE

FIG.7

| FLASH MEMORY NUMBER | SECTOR NUMBER | WRITING LIFE | LOGICAL SECTOR | PHYSICAL SECTOR |
|---|---|---|---|---|
| 1 | 0 | 30% | 0 | 5000 |
| | 1 | 40% | 1 | 5001 |
| | | | | |
| | 5000 | 0% | 5000 | 0 |
| | 5001 | 0% | 5001 | 1 |
| | | | | |
| | n | 20% | 9999 | 9999 |
| | | | | |
| N | 0 | 20% | 100000 | 0 |
| | 1 | 30% | 100001 | 1 |
| | | | | |
| | N | 40% | 109999 | 9999 |

3000 : FLASH MEMORY SECTOR TABLE

STORAGE SYSTEM AND STORAGE MANAGEMENT METHOD FOR CONTROLLING OFF-LINE MODE AND ON-LINE MODE OF FLASH MEMORY

This is a Continuation of application Ser. No. 13/194,841, filed Jul. 29, 2011, which is a Continuation of application Ser. No. 12/019,049 filed Jan. 24, 2008 (now U.S. Pat. No. 8,019,930), claiming priority based on Japanese Patent Application No. 2007-028262, filed on Feb. 7, 2007, the entire contents of all of which are incorporated herein by reference in their entirety.

BACKGROUND OF THE INVENTION

1. Field of the Invention

The present invention relates to a storage system and a storage management method, and more particularly to a storage system which manages data in a storage area of a storage device for a long period of time in a computer system using a computer and the storage device.

2. Description of the Related Art

In a computer system in companies or the like, in accordance with the increase in the amount of storage data and the prolonged storage period of data, the capacity of storage media for storing data has also been increased. Further, in order to store data for a long period of time, the life of the storage media needs to be considered. Among data storage media, there is a nonvolatile semiconductor memory as exemplified by a write-frequency limited type memory such as a flash memory. The flash memory has a limitation of write frequency, but is generally said to have a longer life as compared with the disk drive because the flash memory can be operated without power for rotating the drive or the like.

Further, in order to compensate the limitation of write frequency of the flash memory, there is disclosed a technique in Japanese Patent Laid-Open No. 6-124596 (Patent document 1), in which a controller manages the frequency of writing to sectors of the flash memory so as to prevent erasing parts from being concentrated on specific sectors, thereby enabling the life of the flash memory to be prolonged.

There are following problems in such conventional method. As a result of the extension of the life of the storage medium constituted by the flash memory, the life of the storage medium may be longer than that of the controller which controls the storage medium. In this case, it is possible to use the same flash memory in such a manner that the flash memory is removed from the storage device, that is, placed in off-line mode so as to be loaded onto another storage device, or that the controller whose life is expired is replaced by another controller.

However, in the conventional technique, since management information is managed by the controller, when the flash memory is removed and operated by being loaded onto another controller, the write frequency, that is, the life of the flash memory to the writing is not taken over. As a result, the new controller is unable to grasp the use degree of the flash memory.

SUMMARY OF THE INVENTION

In order to solve the above described problem, the following means is used. That is, according to the present invention, there is provided a storage system which has flash memories constituting a storage area and a function of placing and handling the flash memories in on-line mode and off-line mode, and which stores and manages management information of the flash memories in on-line mode, the storage system including: when some or all of flash memory in on-line mode is placed in off-line mode, creating a management area in off-line mode in the flash memories by moving existing data in an area used as the management area to an area other than the management area; writing the management information of the flash memories to the created management area; and placing the flash memories in off-line mode.

According to the present invention, even when the flash memory is placed in off-line mode, it is possible to hold management information such as volume information and life information, which are necessary for permitting the flash memory to be managed on the device side. Since the management information is written only when the flash memory is placed in off-line mode, it is possible to reduce the frequency of writing to the flash memory, to thereby avoid shortening of the life of the flash memory. Further, the data can be taken over only by exchanging the flash memory without using communication mode.

BRIEF DESCRIPTION OF THE DRAWINGS

FIG. 2 shows an example of a volume table and the like which is used in the storage system according to example 1;

FIG. 3 shows an example of a flash memory sector table and the like which is used in the storage system according to example 1;

FIG. 4 shows an example of a flash memory management area table used in the storage system according to example 1;

FIG. 7 shows an example of a flash memory sector table used in the storage system according to example 1;

DETAILED DESCRIPTION OF THE PREFERRED EMBODIMENTS

In the following, embodiments according to the present invention will be described.

In an embodiment according to the present invention, when a flash memory is placed in off-line mode, the limitation of write frequency of the flash memory is taken into consideration. Further, when the flash memory is placed in off-line mode, the writing of volume information and life information is performed in order to permit data managed in the flash memory to be used once more. A controller of a storage device divides the flash memory into a management area and a data area, and manages the divided areas, respectively. Data from a host computer are written in the data area, and the management area is used only when the flash memory is placed in off-line mode. The management area is created, when the flash memory is placed in off-line mode. At this time, a sector of the flash memory is selected as the management area, so that data in the sector selected as the management area is moved to a sector in the data area. Then, a management computer and the host computer notify the controller of the flash memory to be placed in off-line mode. The controller writes the flash memory life information associated with the write frequency, and management information on a RAID configuration and a volume segmented from the RAID configuration to the management area in the flash memory, so as to place the flash memory in off-line mode.

Then, after the loading of the flash memory placed in off-line mode is completed, the management computer instructs the controller of the storage device and the other controller to again place the flash memory in on-line mode, that is, to make data from the loaded flash memory available. Then, the controller reads the management information from the loaded flash memory to start the operation of the flash memory. In the case of a RAID configuration, the controller collectively generates management information from information of a plurality of flash memories. Then, the controller releases the information in the management area and again utilizes the released management area as a data area.

In the following, examples of the storage system and storage management method according to the present invention will be described in detail with reference to the accompanying drawings. The storage system according to the present invention includes one or more storage devices which have a memory constituting a storage area, and hereafter, may be simply referred to as a storage.

Figure 1:
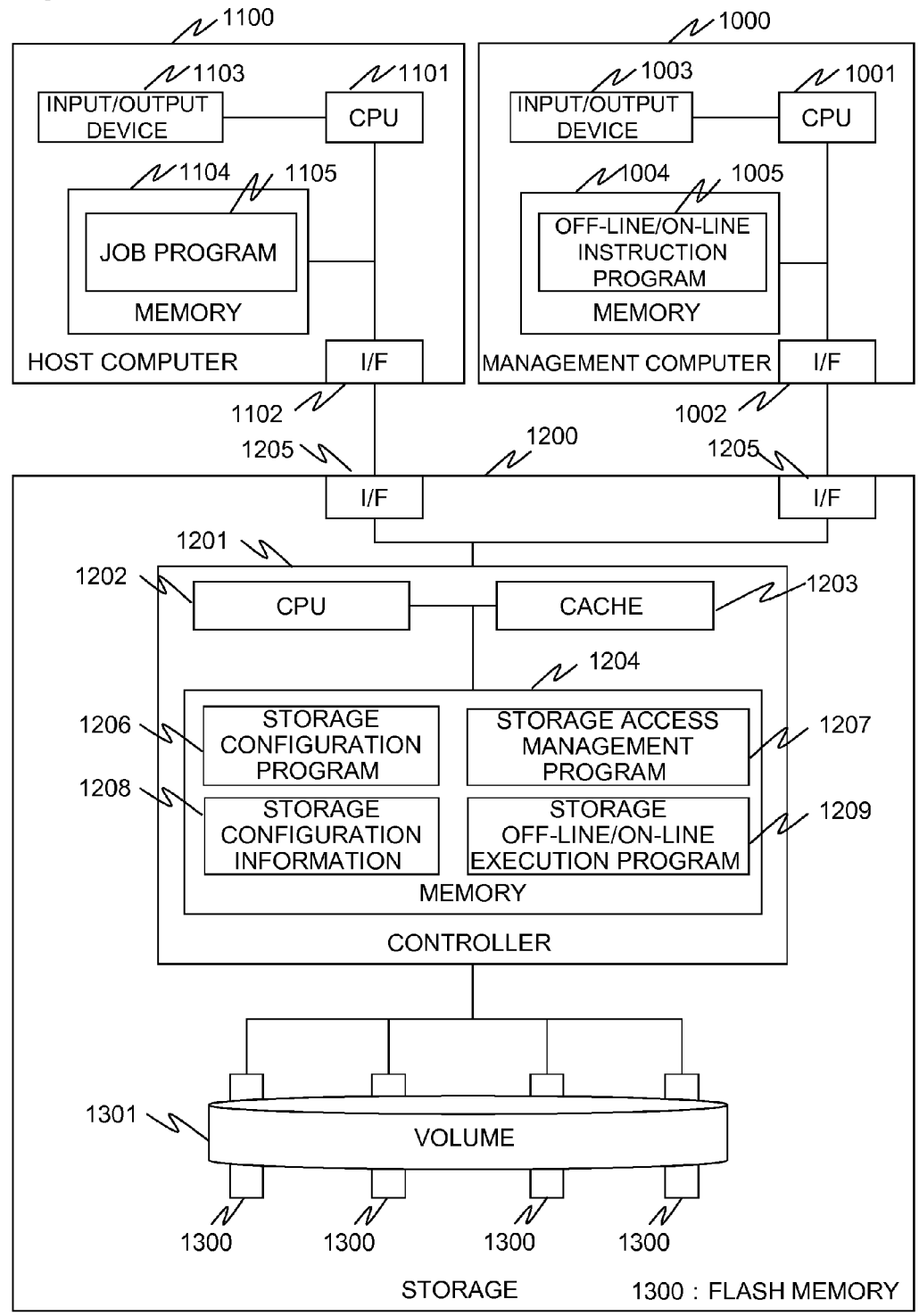
FIG. 1 shows an example of a configuration of a computer system according to example 1.

Example 1 is explained. FIG. 1 shows an example of a configuration of a computer system in a first embodiment according to the present invention. A management computer 1000 is a computer having a CPU 1001, an I/F 1002 which communicates with a storage 1200, an input/output device 1003 which inputs and outputs information from and to a user, and a memory 1004. The memory 1004 stores an off-line/on-line instruction program 1005. Further, the management computer 1000 may be configured to be able to instruct a storage configuration of the storage 1200, such as for example, a path configuration.

A host computer 1100 is a computer having a CPU 1101, an I/F 1102 which communicates with the storage 1200, an input/output device 1103 which inputs and outputs information from and to the user, and a memory 1104. The memory 1104 stores a job program 1105 necessary for performing a job on the host computer. The job program 1105 is operated by the CPU 1101.

The storage 1200 is a storage device having a controller 1201, I/Fs 1205 which perform communication associated with an operation request from the management computer 1000 and operations of reading and writing from and to the host computer 1100, a volume 1301 which is an area for storing data from the host computer 1100, and flash memories 1300 which are storage media constituting the volume. The controller 1201 is constituted by a CPU 1202, a cache 1203 which is utilized to improve performance of the storage 1200, and a memory 1204.

When the communication modes in the I/Fs 1205 are different from each other, for example, when the communication on the operation request from the management computer 1000 is based on IP (Internet Protocol), and the communication on data I/O from/to the host computer 1100 is based on FC (Fibre Channel), communication devices may be separately arranged for the respective communication modes. Further, even when the same protocol is used for the communication with the computers, a plurality of communication devices may be arranged depending upon the difference in application and the difference in configuration.

The memory 1204 stores a storage configuration program 1206, a storage access management program 1207, a storage configuration information 1208, and a storage off-line/on-line execution program 1209. The CPU 1202 executes the storage configuration program 1206, the storage access management program 1207, and the storage off-line/on-line execution program 1209 to realize the functions of the programs. The storage configuration information 1208 is information used by the storage configuration program 1206, the storage access management program 1207, and the storage off-line/on-line execution program 1209, and managed in the storage 1200.

The storage configuration program 1206 is a program for managing the configuration of the storage 1200, and has a function for making computers such as the management computer 1000 recognize the volume 1301 via the I/F 1205, a function for moving data within the volume, a function for reading and writing data from and to the flash memory and the volume, a function for making data in an area of the flash memory invalid by shredding the area, and the like.

The storage access management program 1207 is a program which manages the writing life of the flash memories 1300 and moving data between the flash memories in the storage 1200.

The storage off-line/on-line execution program 1209 is a program which actually controls off-line mode and off-line mode of the flash memories.

The volume 1301 may be constituted by the flash memories 1300 by themselves or a logical volume which has the plurality of flash memories 1300 to realize a volume with a RAID configuration.

FIG. 2, FIG. 3 and FIG. 4 show examples of information stored in the storage configuration information 1208 in the storage 1200 according to example 1.

The storage configuration information 1208 includes a volume table 2000, a parity group table 2100, a flash memory sector table 3000, and a flash memory management area table 4000. Here, the parity group is a unit of storage media by which a RAID configuration is formed.

As shown in FIG. 2, the volume table 2000 includes columns for flash memory numbers 2001, volume numbers 2002, start logical sectors 2003, and final logical sectors 2004.

The volume is an area for storing data. However, in the volume which has a RAID configuration and is created on the basis of a parity group, even when data are physically scattered in a plurality of storage media, the storage media are logically handled as one area. The volume may also be referred to as a logical unit. Further, when a single flash memory is handled as a volume, the parity group table 2100 is not necessary.

The flash memory number 2001 is an identifier of a single flash memory itself. The volume number 2002 is an identifier uniquely imparted to identify the volume 1301. The start logical sector 2003 indicates the number of the first logical sector assigned to each of the volumes 1301 which correspond to the volume numbers 2002, respectively. The final logical sector 2004 indicates the number of the last logical sector assigned to each of the volumes 1301 which correspond to the volume numbers 2002, respectively.

The assignment range of volumes created in the respective flash memories which are formed into a RAID configuration, is managed by the start logical sector 2003 and the final logical sector 2004 for each of the flash memories which are designated by the flash memory numbers 2001. For example, it is seen from the volume table 2000 that a volume of the volume number 1 is assigned in an area having the start logical sector 2003 of 0 and the final logical sector 2004 of 999 in the flash memory of the flash memory number 1, an area having the start logical sector 2003 of 10000 and the final logical sector 2004 of 10999 in the flash memory of the flash memory number 2, an area having the start logical sector 2003 of 20000 and the final logical sector 2004 of 20999 in the flash memory of the flash memory number 3, and an area having the start logical sector 2003 of 30000 and the final logical sector 2004 of 30999 in the flash memory of the flash memory number 4. The number of the logical sector may be referred to as LBA (Logical Block Address).

As shown in FIG. 2, the parity group table 2100 includes columns for parity group numbers 2101, storage medium numbers 2102 and RAID types 2103, which are provided for each parity group. Here, the parity group is a unit which is formed by the storage media of the storage, and by which a RAID configuration is formed.

The parity group number 2101 is an identifier uniquely imparted to identify a parity group formed in the storage 1200. The storage medium number 2102 is an identifier of a storage medium constituting the parity group, and represented by the information of the storage medium numbers 2102. In the example of the parity group table 2100, the storage media constituting the parity group P0 are storage media having the numbers of 1, 2, 3 and 4. This indicates that the parity group is constituted by storage media designated by the storage medium numbers 2102 of 1, 2, 3 and 4 in the parity group table 2100.

The flash memory sector table 3000 is a table which manages the state of sectors in the flash memory. As shown in FIG. 3, the flash memory sector table 3000 includes columns for flash memory numbers 3001, sector numbers 3002, writing life 3003, logical sectors 3004, and physical sectors 3005.

The flash memory number 3001 is an identifier of a single flash memory itself similarly to the flash memory number 2001 in the volume table 2000. The sector number 3002 indicates a number for identifying a sector. The writing life 3003 indicates the degree of used rate of each sector with respect to the use life of the sector, that is, the written frequency of each sector with respect to the upper limit of write enable frequency of the sector. Thus, a sector having long writing life means a sector having a low used rate. The logical sector 3004 indicates a logical number of a sector. The physical sector 3005 indicates a physical number of a sector. Note that the written frequency may be used as the writing life 3003. Further, it is also possible that the remaining write enable frequency, the remaining write enable degree, or the like, are used instead of the writing life, and a sector having a high remaining write enable frequency or a high remaining write enable degree is designated as a sector having long writing life.

A flash memory state table 3100 is a table for managing the on-line mode or off-line mode of the flash memory and includes columns for flash memory numbers 3101 and on-line/off-line 3102, as shown in FIG. 3.

The flash memory number 3101 is an identifier of a single flash memory itself similarly to the flash memory number 2001 of the volume table 2000.

The on-line/off-line 3102 is information representing whether the flash memory is in on-line mode or off-line mode. For example, in the example shown in FIG. 3, the flash memory of the flash memory number 1 is operated in on-line mode, and the flash memory of the flash memory number 105 is in off-line mode.

The flash memory management area table 4000 is a table indicating an area used as a management area when the flash memory is placed in off-line mode, and includes columns for flash memory numbers 4001, management area start physical sectors 4002, and management area final physical sectors 4003, as shown in FIG. 4.

The flash memory number 4001 is an identifier of a single flash memory itself similarly to the flash memory number 2001 of the volume table 2000, and the flash memory number 3001 of the flash memory sector table 3000. The management area start physical sector 4002 represents the start position of the physical sector of the area used as the management area in off-line mode. The management area final physical sector 4003 represents the final position of the physical sector of the area used as the management area in off-line mode.

The position of the management area in each flash memory is indicated by the management area start physical sector 4002 and the management area final physical sector 4003. For example, in the flash memory of the flash memory number 1, a sector area between the physical sector 0 and the physical sector 100 is used as the management area.

The CPU 1202 executing the storage configuration program 1206 handles the area, which the CPU 1202 utilizes as the management area when placing the flash memory in off-line mode, as a data area before placing the flash memory in off-line mode. Such handling is a technique for leveling the write frequency of the flash memory. However, the CPU 1202 executing the storage access management program 1207 performs a monitoring operation so that an area corresponding to the management area can be secured in the flash memory. Therefore, the area which can be utilized as the data area by the storage configuration program 1206 is an area obtained by subtracting the area corresponding to the management area in off-line mode from the whole area of the flash memory.

In FIG. 2, FIG. 3 and FIG. 4, after the CPU 1202 operating the storage configuration program 1206 makes the host computer recognize the volume, the CPU 1202 operating the storage access management program 1207 updates the values with the data written by the host computer. Further, the flash memory management area table 4000 may also be configured to be managed from the time of loading the flash memory.

Figure 5:
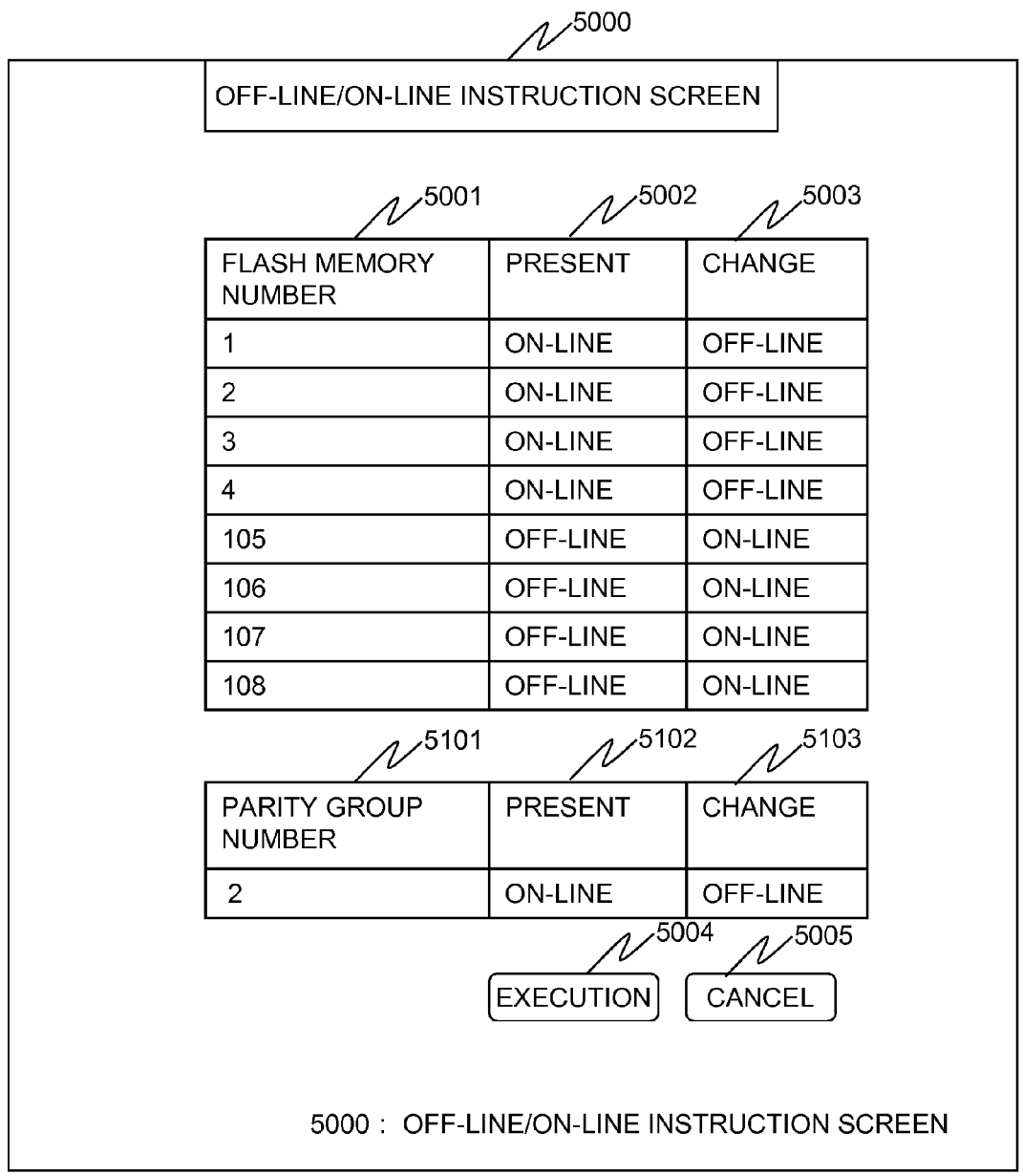
FIG. 5 shows an example of a configuration screen used in the storage system according to example 1.

FIG. 5 shows an example of a screen in example 1, by which a user performs instruction operation to place flash memories in off-line mode or off-line mode. This screen is a screen outputted by the CPU 1001 by using the off-line/on-line instruction program 1005 of the management computer 1000.

An off-line/on-line instruction screen 5000 includes columns for the flash memory numbers 5001, present 5002 which represents the state of flash memories at the time of input, and change 5003 which represents states to which the flash memories are desired to be changed. The user's input objects are the flash memory number 5001 and the change 5003. The CPU 1001 acquires the information shown in the present 5002 from the flash memory state table 3100 on the basis of the flash memory number 5001 by using the off-line/on-line instruction program 1005.

Further, the off-line/on-line instruction screen 5000 also enables the designation by a parity group to be performed, and includes columns for parity group numbers 5101, present 5102 which represents a state of the parity group at the time of input, and change 5103 which represents a state to which the parity group is desired to be changed. The user's input objects are the flash memory number 5101 and the change 5103. The CPU 1001 acquires the information shown in the present 5102 from the parity group table 2100 and the flash memory state table 3100 on the basis of the parity group number 5101 by using the off-line/on-line instruction program 1005. That is, when all the flash memories constituting the parity group are on-line, the parity group becomes on-line. When all the flash memories constituting the parity group are off-line, the parity group becomes off-line. When the flash memories constituting the parity group are partially on-line and off-line, both states of on-line and off-line are represented.

The off-line/on-line instruction screen 5000 also includes an execution button of execution 5004 for actually issuing an execution request corresponding to the user's input values 5001, 5003, 5101 and 5103, and a button of cancel 5005 for canceling the execution. The off-line/online instruction screen 5000 may also be configured in such a manner that after the button of execution 5004 is pushed, the cancel 5005 is displayed, and then the data storage designation screen is displayed by pushing the cancel button.

For example, the input value of the flash memory number 5001 is designated by the same value as the flash memory number 2001 of the volume table 2000, and the input value of the parity group number 5101 is designated by the same value as the parity group number 2101 of the parity group table 2100.

In the off-line/on-line instruction screen 5000, one or both of the instruction to place a single flash memory as a unit in on-line mode or off-line mode and the instruction to place a parity group as a unit in on-line mode or off-line mode may be performed. When both of the instruction in the unit of a single flash memory and the instruction in the unit of a parity group are eventually set to place the same flash memory in on-line mode or off-line mode, the instruction in the unit of a parity group is preferentially performed. The priority between the instructions may also be set by the user. When both of the instructions are set to the same flash memory, an error message may also be displayed so as to permit one of the instructions to be performed.

Figure 6:
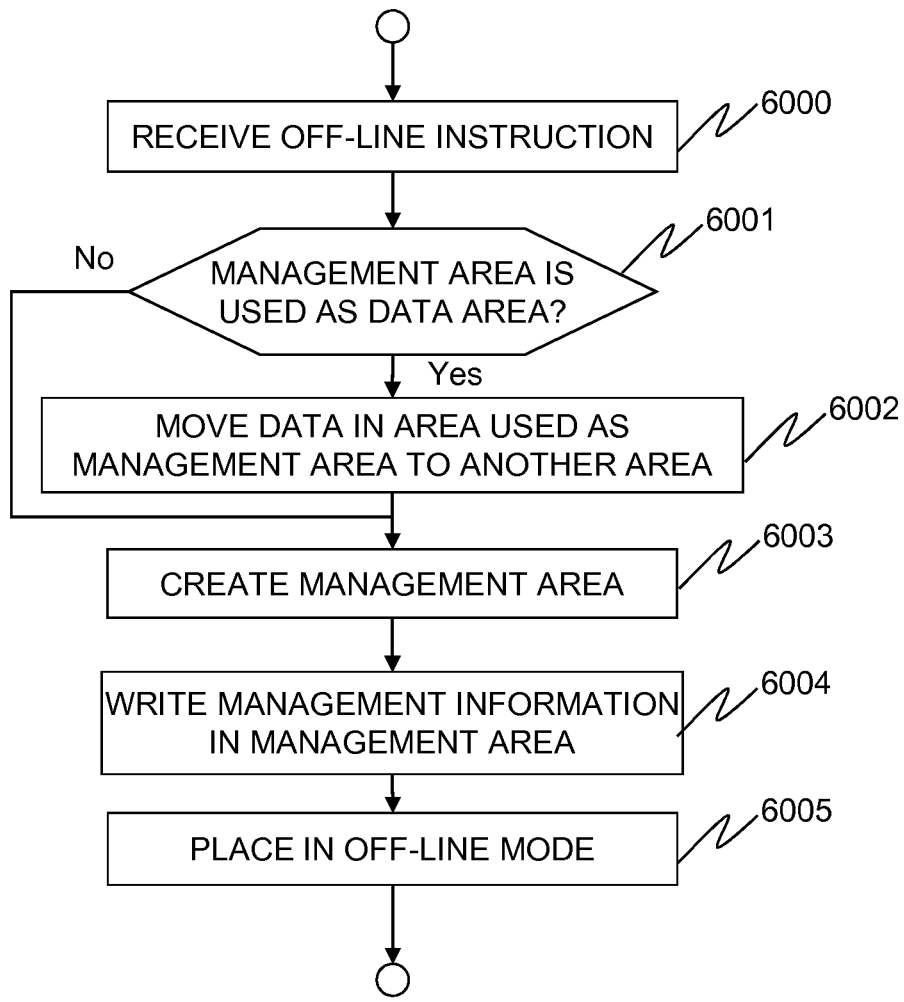
FIG. 6 shows an example of a flow chart for placing flash memories in off-line mode in the storage system according to example 1.

FIG. 6 shows an example of a flow chart of a process for placing the flash memory in off-line mode in the example 1. In FIG. 6, the CPU 1202 performs processing by the storage off-line/on-line execution program 1209 in the storage 1200.

The CPU 1202 receives an off-line request from the CPU 1001 which operates the off-line/on-line instruction program 1005 in the management computer 1000 (step 6000). Here, a screen for example as shown in FIG. 5 is prepared to permit the user to set the off-line instruction.

Next, the CPU 1202 checks whether or not an area to be used as the management area when the flash memory to be placed in off-line mode is off-line, is used as a data area (step 6001). When the management area is used as the data area, the CPU 1202 proceeds to step 6002. When the management area is not used as the data area, the CPU 1202 proceeds to step 6003.

In step 6002, the CPU 1202 moves data in the area to be used as the management area at the time of off-line to another area, that is, another location of physical sector. Then, the CPU 1202 proceeds to step 6003.

In step 6003, the CPU 1202 declares that the area created by moving the data in step 6002 is handled as the management area. At this time, an instruction is given to the CPU 1202 operating by using the storage configuration program 1206, so as to prevent the CPU 1202 from writing data in the management area. The CPU 1202 operating by using the storage configuration program 1206 may also be instructed to be unable to read the data in the management area. Then, the CPU 1202 proceeds to step 6004.

In step 6004, the CPU 1202 writes management information necessary for placing the flash memory in off-line mode in the management area. The necessary management information includes information in the respective flash memories, that is, the information on the parts of respective flash memories in the volume table 2000, and the information on the parts of respective flash memories in the flash memory sector table 3000. The information in the parity group table 2100 may be stored only in a flash memory representing a parity group, or may be stored in all flash memories associated with the parity group. Then, the CPU 1202 proceeds to step 6005.

In step 6005, the CPU 1202 places the flash memory in off-line mode. That is, the CPU 1202 brings the flash memory into a removable state.

After the above described steps are completed, the flash memory is removed for example by the user and stored.

FIG. 7 shows an example of a changed state of the flash memory sector table 3000 (see FIG. 3) after the processing shown by the flow chart in FIG. 6 is completed.

In the example of the flash memory management area table 4000 shown in FIG. 4, the management area of the flash memory of the flash memory number 1 has the management area start physical sector of 0 and the management area final physical sector of 100.

From the examples of the volume table 2000 in FIG. 2 and the flash memory sector table in FIG. 3, it is seen that in the above described physical sectors, the area designated by the sector number 0 of the flash memory number 1 is used as a data area of the volume number 1. Thus, it is necessary to move the data in this area to another sector. From the volume table 2000, it is seen that the logical sectors from 0 to 1999 are used and the other areas of the logical sectors are not used. Thus, the data are moved to an area other than the area of the logical sectors from 0 to 1999. At this time, under the condition that the sectors to which the data are moved are preferentially selected from the area whose write frequency is low, the data are moved to the area designated, for example, by the logical address 5000, because the writing life of this area is 0%. Then, the numbers of the logical sectors are exchanged. Similarly, the data in the areas of the sector numbers 1 to 1000 are moved to the other sectors. Then, the area having addresses of the physical sectors 0 to 1000 is used as the management area, and the management information is stored in this area.

Figure 8:
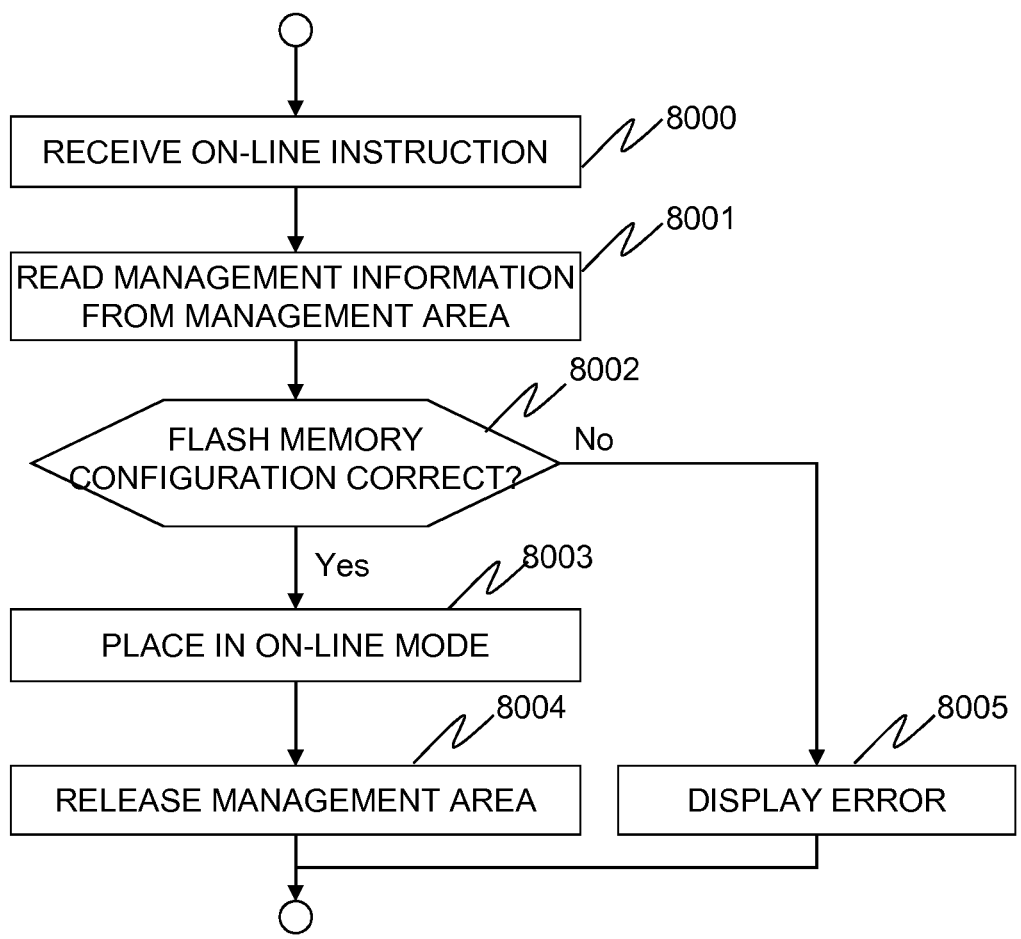
FIG. 8 shows an example of a flow chart for placing flash memories in on-line mode in the storage system according to example 1.

FIG. 8 shows an example of a flow chart of a process in which a flash memory in off-line mode is placed in on-line mode.

In FIG. 8, the CPU 1202 performs processing by the storage off-line/on-line execution program 1209 in the storage 1200. Further, the flash memory to be placed in on-line mode is already loaded onto the storage 1200.

The CPU 1202 receives an on-line instruction from the CPU 1001 which operates the off-line/on-line instruction program 1005 in the management computer 1000 (step 8000). Here, a screen for example as shown in FIG. 5 is prepared to permit the user to set the on-line instruction.

Next, the CPU 1202 reads the management information in the management area of the flash memory to be placed in on-line mode so as to enable the management information to be managed by the controller (step 8001). Since the information equivalent to that in the flash memory management area table 4000 shown in FIG. 4 is stored in the flash memory, the CPU 1202 is able to grasp the read position of the management area by acquiring the information. The CPU 1202 may also be able to actually read the data stored in the flash memory by reading the information. Then, the CPU 1202 proceeds to step 8002.

Next, in step 8002, the CPU 1202 checks whether or not the flash memories to be placed in on-line mode are formed into a correct configuration, on the basis of the management information acquired in step 8001. For example, when the flash memories are formed into a RAID configuration, the CPU 1202 cannot read the data stored in the flash memories which are not based on the RAID configuration. Specifically, on the basis of the storage medium information 2102 in the parity group table 2100, which is stored as the management information of the flash memories, the CPU 1202 checks whether or not the flash memories to be placed in on-line mode have numbers included in the storage medium information 2102. Then, when the flash memory is correctly configured, the CPU 1202 proceeds to step 8003. When the flash memory is not correctly configured, the CPU 1202 proceeds to step 8005.

In step 8003, the CPU 1202 performs processing to place the flash memory in on-line mode. That is, the CPU 1202 receives data access from the host computer 1100. However, as described with reference to the flow chart in FIG. 6, when a management area exists, the CPU 1202 operating the storage configuration program 1206 may inhibit the writing to the management area, and also inhibit the reading from the management area. Then, the CPU 1202 proceeds to step 8004.

In step 8004, the CPU 1202 releases the data in the management area. That is, the CPU 1202 permits the management area to be used as a data area. In practice, the CPU 1202 operating the storage configuration program 1206 permits the writing and reading to and from the management area. However, when the writing is permitted while the data are left in the management area, the data in the management area may be read by unauthorized access. Thus, the CPU 1202 operating the storage configuration program 1206 may perform the shredding operation to make the data invalid before releasing the management area, and thereafter release the management area. Then, the CPU 1202 ends the processing.

In step 8005, the CPU 1202 notifies the user who has set the instruction by using the off-line/online instruction screen 5000 in FIG. 5, of the error that the flash memories are not formed into a correct configuration, via the off-line/on-line instruction program 1005 in the management computer 1000. Then, the CPU 1202 ends the processing. The error may be notified by a screen display, or may also be notified to the user by an e-mail. As the error, a correct configuration of storage media, that is, information necessary for placing the flash memories in on-line mode may also be presented. As this information, the information on the storage medium number 2102 in the parity group 2100 is displayed. In the presentation, the information on the flash memories in on-line mode, that is, for example, the loaded flash memories and the information on the flash memories which are not loaded may also be separately displayed.

As a result, when the flash memories placed in off-line mode through the processing based on the flow chart in FIG. 6 is placed in on-line mode through the processing based on the flow chart of FIG. 8, the data stored in the flash memories can be used as they are by the host computer 1100 and the management computer 1000, whereby the life information of the flash memories can also be taken over as it is, and managed.

In example 1, the system may also be configured in such a manner that while the on-line and off-line states of the respective volumes are managed, when all of the volumes in a flash memory are placed in off-line mode, the flash memory are placed in off-line mode so as to be able to be removed. The user may also be permitted to select whether or not the above described processing is performed.

Further, in example 1, the system may also be configured in such a manner that even when the system is not formed into the RAID configuration, a single flash memory is handled as a volume, or a part of the single flash memory is segmented to be defined as a volume, and the defined volumes are handled. In this case, the management can also be performed similarly to the case in example 1.

Further, in example 1, a group of a plurality of flash memories, which is referred to as a slot, may be handled as a unit in a form of a flash disk. In this case, it is possible not only to move data between sectors within the flash memories, but also to similarly move the data in the flash memories as required by managing the sectors in the range of the slot. It is also possible to remove the flash memories in the unit of the slot.

Further, the arrangement of physical sectors as the management area is fixed in example 1, but the system may also be configured in such a manner that only the pointer and the range of the management area are managed so as to correspond to a certain sector independently of the arrangement of physical sectors, and the actual management area indicated by the pointer is arranged in any part of the physical sectors.

Further, in example 1, the selection system of the sector may also be configured so as to make a sector having a low write frequency selected similarly to the above described first embodiment. Alternatively, since the write frequency to the management area is judged to be low, a sector having a high write frequency, or in particular, a sector having a write frequency exceeding a threshold value, on the basis of which the write frequency of the sector is managed, and still having a room for the writing, may also be selected.

Figure 9:
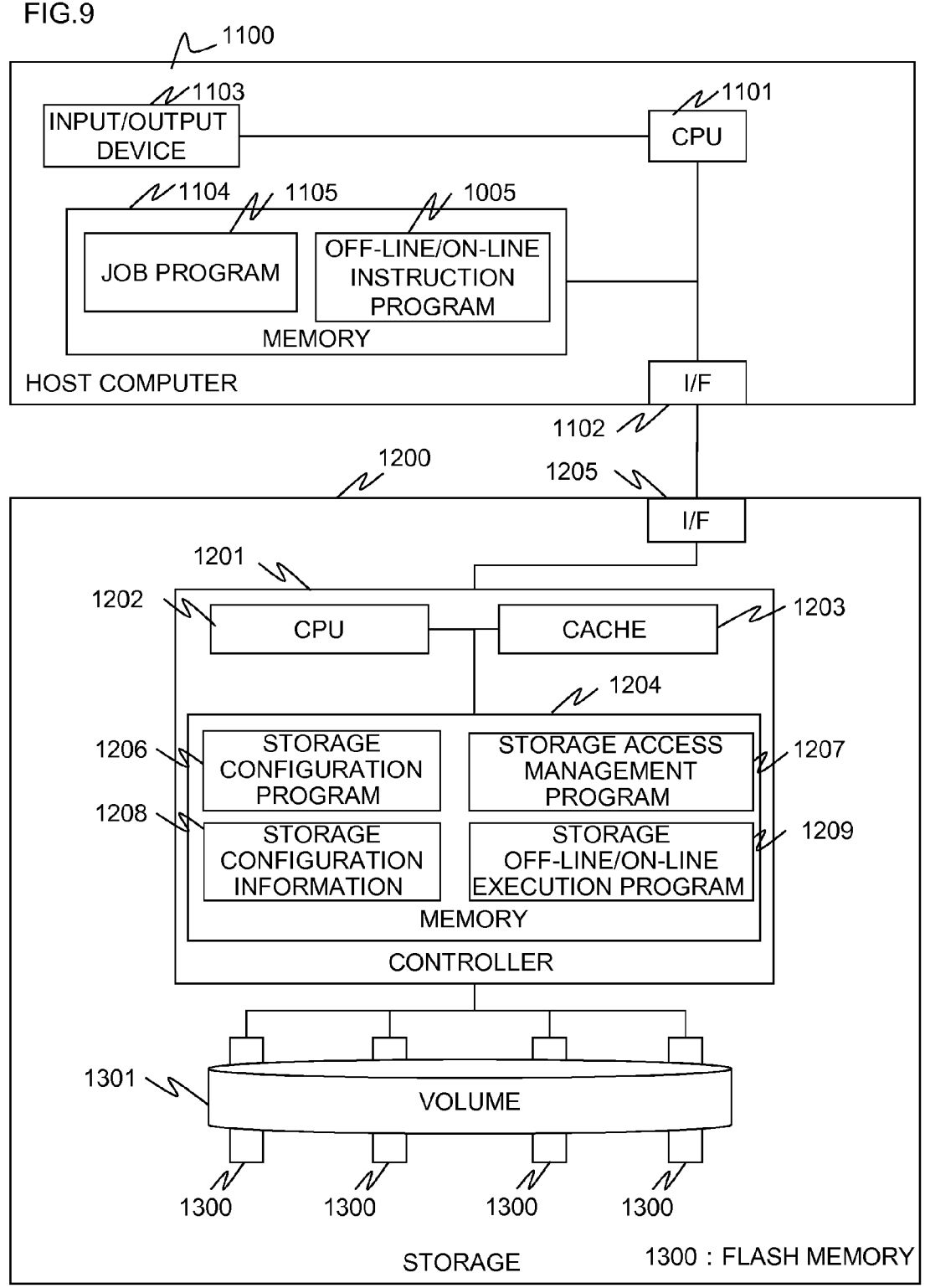
FIG. 9 shows an example of a configuration of a computer system according to example 2.

Next, an example 2 is explained. FIG. 9 is a figure showing a configuration of a computer system in a second embodiment according to the present invention. This computer system has a configuration similar to that of example 1 shown in FIG. 1, but differs from example 1 in that the off-line/on-line instruction program 1005 which is stored in the memory 1004 of the management computer 1000 in example 1 is stored in the memory 1104 of the host computer 1100. In this computer system, the off-line and on-line instructions are judged by the job program 1105 through cooperative operations between the off-line/on-line instruction program 1005 and the job program 1105, and the like. On the basis of the judgment performed by operating the job program 1105, and the like, the off-line and on-line instructions are issued to the off-line/on-line instruction program 1005, whereby the off-line and on-line instructions can be issued without the intervention of the user and the management computer 1000.

Further, in the case where a number of volumes are necessary, when the volume numbers are exchanged, when the operation of volumes is once stopped, or the like, the volumes themselves are placed in off-line mode. In this case, the system may also be configured in such a manner that the judgment performed by operating the job program 1105 is received by the off-line/on-line instruction program 1005, whose instruction is received by the storage 1200, and thereafter when all the associated volumes in the respective flash memories are placed in off-line mode, the flash memories are also placed in off-line mode by the processing as shown in the flow chart in FIG. 6.

As described above, the present invention is explained with reference to the examples. A further embodiment 1 according to the present invention is a storage system which has a function of placing and handling flash memories constituting a storage area in off-line mode and on-line mode, and which stores and manages management information of the flash memories in on-line mode, the storage system including: when the flash memories in off-line mode is placed in on-line mode, reading the management information from the management area of the flash memories; placing the flash memories in on-line mode; and releasing the management area of the flash memories as a data area.

A further embodiment 2 according to the present invention is a storage system wherein in the storage system of the present invention, a sector having a long writing life is selected as a destination to which the above described existing data are moved.

A further embodiment 3 according to the present invention is a storage system wherein in the storage system of the present invention, when the flash memories are placed in on-line mode, the volume assignment in the flash memories is managed so as to make the area corresponding to the management area secured in the flash memories.

A further embodiment 4 according to the present invention is a storage system wherein in the storage system of the present invention or the embodiment 1, the management information of the flash memories is the writing life of the flash memories.

A further embodiment 5 according to the present invention is a storage system wherein in the storage system of the present invention or the embodiment 1, the management information of the flash memories is the volume information of the flash memories.

A further embodiment 6 according to the present invention is a storage system wherein in the storage system of the present invention or the embodiment 1, the management information of the flash memories is the volume information including information of a RAID configuration formed by a plurality of flash memories.

A further embodiment 7 according to the present invention is a storage system wherein in the storage system of the embodiment 1, when the flash memories in off-line mode are placed in on-line mode, whether or not a RAID configuration is correctly configured is checked on the basis of the read management information, and when the RAID configuration is not correctly configured, an error is notified, and flash memories enabling the RAID configuration to be correctly configured are presented.

A further embodiment 8 according to the present invention is a storage system wherein in the storage system of the embodiment 1, the data in the management area of the flash memories are made invalid, and thereafter the management area is released as a data area.

A further embodiment 9 according to the present invention is a storage management method of a storage system which has flash memories constituting a storage area and a function of placing and handling the flash memories in off-line mode and on-line mode, and which stores and manages management information of the flash memories in on-line mode, the storage management method including: when some or all of the flash memories in on-line mode are placed in off-line mode, creating a management area in off-line mode in the flash memories by moving existing data in an area to be used as the management area to an area other than the management area; writing the management information of the flash memories to the created management area; and placing the flash memories in off-line mode.

A further embodiment 10 according to the present invention is a storage management method including: in the storage management method of the embodiment 9, when the flash memories in off-line mode are placed in on-line mode, reading management information from the management area of the flash memories; placing the flash memories in on-line mode; and releasing the management area of the flash memories as a data area.

What is claimed is:
1. A storage system comprising:
plurality of flash memories constituting a data storage area for storing data;
a controller coupled to the plurality of flash memories, and controlling I/O access to the plurality of flash memories;
wherein the controller creates a management area of the first flash memory in the first flash memory which was used as the data storage area, and stores management information of the first flash memory to the management area;
wherein the management information comprises a written frequency; and
wherein data cannot be written into the management area if the management area is handled as the management area and data can be written into the management area if the management area is not handled as the management area.

2. A storage system according to claim 1:
wherein the controller reads the management information from the management area of the first flash memory by using the management information, and releases the portion of the management area of the data storage area.

3. The storage system according to claim 2,
wherein the controller configures a first logical volume by using the plurality of flash memories including the first flash memory,
wherein the management information of the first flash memory is volume information of the first logical volume which is configured by the plurality of flash memories including the first flash memory.

4. The storage system according to claim 3,
wherein the controller configures a RAID (Redundant Array of Independent Disks) group by using the plurality of flash memories,
wherein the controller provides a plurality of logical volumes configured on the RAID group to the host computer,
wherein the management information of the first flash memory is volume information including information of a RAID configuration formed by the plurality of flash memories including the first flash memory.

5. The storage system according to claim 4,
wherein the controller manages a placing of at least one of the plurality of flash memories in an on-line mode or an off-line mode;
wherein when the controller changes the mode of the first flash memory from off-line mode to on-line mode, the controller checks whether or not the RAID configuration is correctly formed based on the read management information,
wherein if the RAID configuration is not correctly formed, the controller notifies the host computer of an error,
wherein if the RAID configuration is correctly formed, the controller configures the first flash memory by using the information of the RAID configuration from the management information, and releases the portion of the management area as the data storage area.

6. The storage system according to claim 5,
wherein the management information of the first flash memories memory is at least one of sector IDs, address information of the sectors, and writing cycles of each sectors of the first flash memories memory.

7. The storage system according to claim 2,
wherein the controller sets the data stored in the management area of the first flash memory invalid, and thereafter releases the portion of the management area as the data storage area.

8. The storage system according to claim 1, wherein the controller manages a placing of at least one of the plurality of flash memories in an on-line mode or an off-line mode;

wherein each of the plurality of flash memories is divided into a plurality of sectors, wherein the controller assigns all sectors in the first flash memory as the data storage area in on-line mode, wherein when the controller changes the mode of the first flash memory from on-line mode to off-line mode, the controller migrates data stored in certain sectors of the data storage area to other sectors of the data storage area and, thereafter, creates the management area by using the certain sectors of the data storage area.

9. The storage system according to claim 8, wherein the controller counts writing cycles on the sector basis, wherein when the controller changes the mode of the first flash memory from on-line mode to off-line mode, the controller creates the management area by using sectors which have a long lifetime based on the counted writing cycles in the first flash memory.

10. The storage system according to claim 9, wherein the management information of the first flash memories memory is at least one of sector IDs, address information of the sectors, and writing cycles of each sectors of the first flash memories memory.

11. The storage system according to claim 8, wherein the controller stores address information of the sectors corresponding to the management area into a memory of the controller, when the controller changes the mode of the first flash memory from on-line mode to off-line mode.

12. The storage system according to claim 8, wherein when the controller changes the mode of the flash memories from off-line mode to on-line mode or on-line mode to off-line mode on basis of the RAID group.

13. The storage system according to claim 1, wherein the controller manages a placing of at least one of the plurality of flash memories in an on-line mode or an off-line mode:

wherein the system includes a display and the display provides a listing of flash memory and an identification of a respective related condition of off-line or on-line.

14. The storage system according to claim 13,

Wherein the storage system has interface which receives the instructions of a respective related condition of off-line or on-line.

* * * * *